United States Patent [19]

Misumi

[11] Patent Number: 5,453,965
[45] Date of Patent: Sep. 26, 1995

[54] REPRODUCING APPARATUS AND REPRODUCING METHOD

[75] Inventor: Hiroyoshi Misumi, Kanagawa, Japan

[73] Assignee: Canon Kabushiki Kaisha, Tokyo, Japan

[21] Appl. No.: 195,821

[22] Filed: Feb. 9, 1994

Related U.S. Application Data

[63] Continuation of Ser. No. 767,028, Sep. 27, 1991, abandoned.

[30] Foreign Application Priority Data

Oct. 2, 1990 [JP] Japan ................... 2-264436

[51] Int. Cl.⁶ .............................................. G11B 7/00
[52] U.S. Cl. ................. 369/58; 369/53; 369/54; 369/47
[58] Field of Search .................. 369/58, 54, 53, 369/50, 48, 47, 32, 124, 44.32, 44.37, 44.34; 360/78.1, 31

[56] References Cited

U.S. PATENT DOCUMENTS 4,785,442 11/1988 Ohtake et al. ............... 369/44.32
4,916,685 4/1990 Endoh et al. ................. 369/47
4,926,404 5/1990 Kimura et al. ............... 369/47
4,969,139 11/1990 Azumatani et al. ........... 369/47

Primary Examiner—Scott J. Sugarman
Assistant Examiner—Muhammad N. Edun
Attorney, Agent, or Firm—Robin, Blecker, Daley & Driscoll

[57] ABSTRACT

According to one aspect of this invention, auxiliary data recorded on a recording medium together with image and/or sound data is reproduced by a plurality of times, and if the auxiliary data reproduced from a predetermined range on the recording medium coincide with each other, it is determined that the auxiliary data reproduced from the predetermined range is true auxiliary data which can be utilized. According to another aspect of the invention, auxiliary data recorded in different areas on a recording medium are repeatedly reproduced, and if the auxiliary data repeatedly reproduced from all areas do not coincide with each other by predetermined times, it is determined whether the auxiliary data repeatedly reproduced from a particular range coincide with each other by predetermined times. If such auxiliary data coincide, it is determined that the auxiliary data reproduced from the particular range is true auxiliary data which can be utilized.

12 Claims, 7 Drawing Sheets

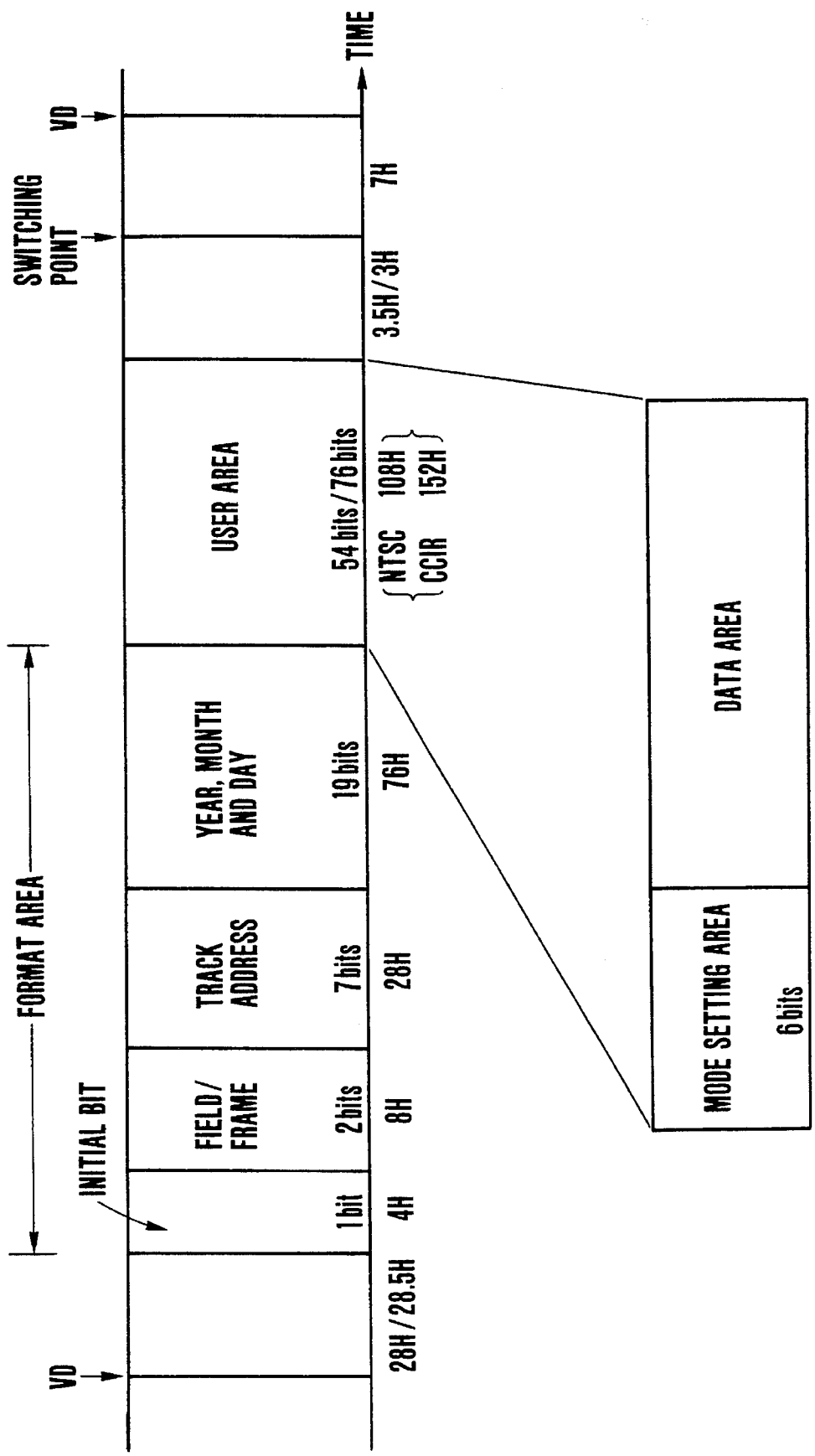

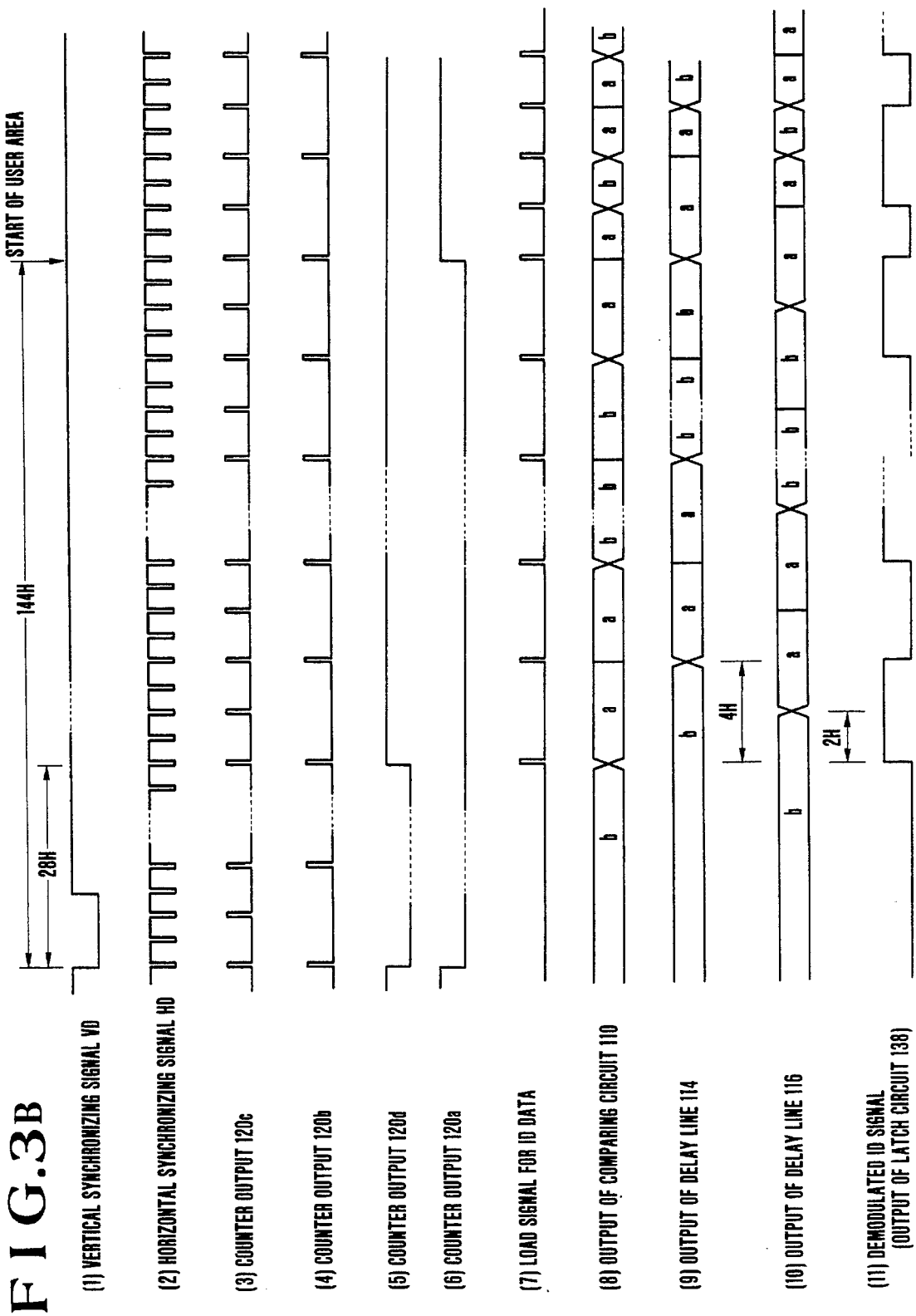

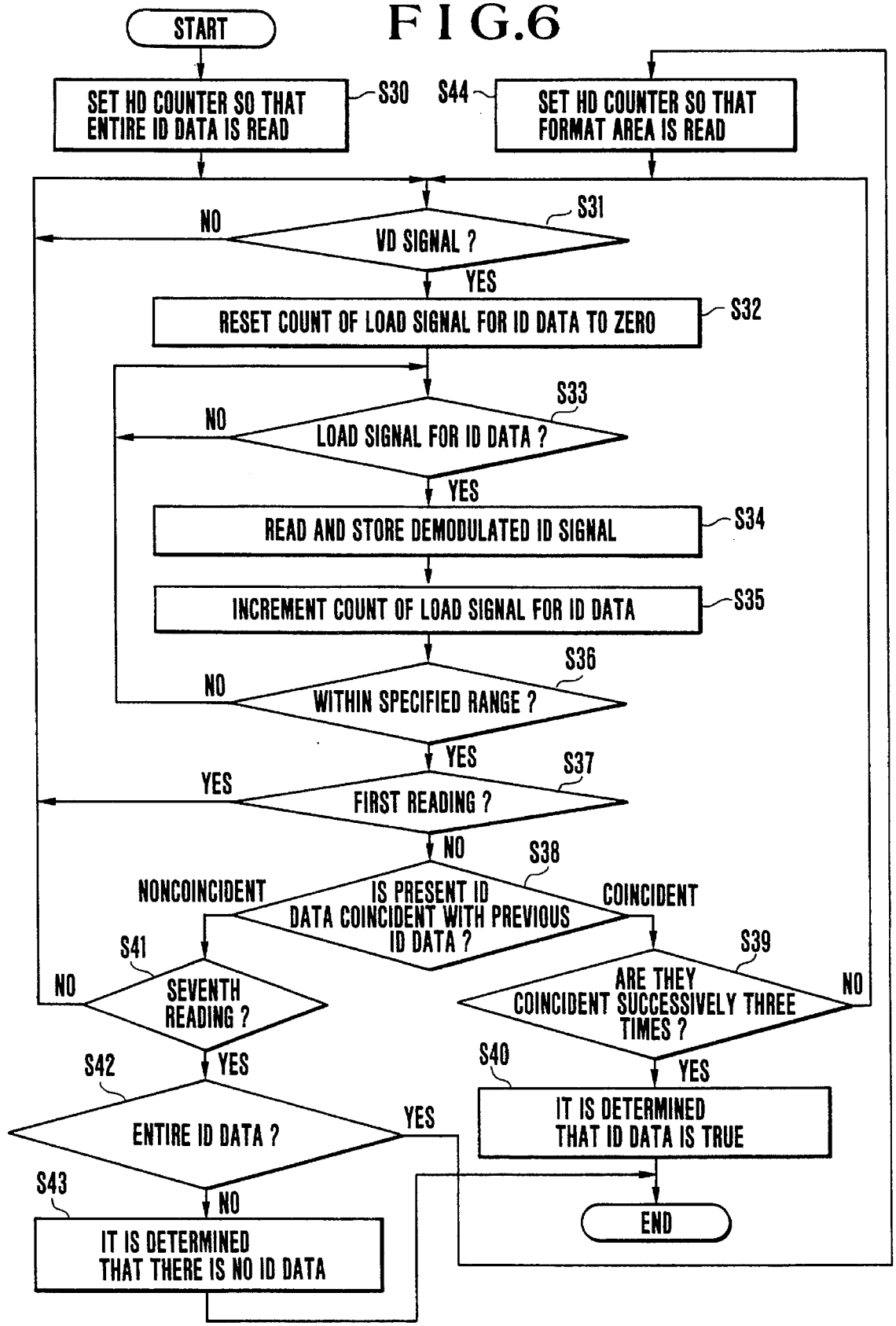

REPRODUCING APPARATUS AND REPRODUCING METHOD

This is a continuation application under 37 CFR 1.62 of prior application Ser. No. 767,028, filed Sep. 27, 1991, now abandoned.

BACKGROUND OF THE INVENTION

1. Field of the Invention

The present invention relates to an image and/or sound reproducing apparatus and, more particularly, to an image reproducing apparatus which utilizes a magnetic disc called a still video floppy disc as a recording medium.

2. Description of the Related Art

Electronic still cameras have already been commercially available as one type of apparatus which utilizes a still video floppy disc. A recording format for the still video floppy disc is prescribed by the "Still Video Conference". According to the "Still Video Conference", the recording format is arranged so that not only image information but also data such as a date, which serves as an ID signal or ID information, can be recorded up to a predetermined amount in a format area and a user area. The ID signal, as shown in FIG. 4, is modulated by DPSK (differential phase-shift keying) into a signal of frequency band lower than that of a video signal, and is recorded together with the frequency-modulated video signal.

The recording level of the ID signal is very low, i.e., 14 dB lower than the recording level of a chrominance signal, and is susceptible to the deterioration of a magnetic disc or external noise. In a method which has conventionally been adopted, for satisfactory reproduction of such a weak ID signal of low S/N, the same recorded ID signal is reproduced by a plurality of times and it is determined whether the repeatedly reproduced data coincide with each other, and if they coincide successively several times during such a plurality of times of reproducing operations, the reproduced data is regarded as true data.

In such a conventional method, however, if the S/N of a part of the recorded ID signal is low, there would be the highly frequent occurrence of the problem that no coincidence of reproduced data can be obtained and no true data is identified. In particular, phase data is recorded in units of 2 H (1 H: one horizontal synchronization period) in a user area of ID information and, therefore, the user area is lower in S/N than a format area in which a recording is made in units of 4 H. Accordingly, there is often a case where although the format area can be read, the user area cannot be read and no ID information can be identified.

SUMMARY OF THE INVENTION

The present invention has, therefore, been devised to solve the problems of the above-described related art and its object is to minimize loss of reproduced data indicative of ID information.

To achieve the above-described object, according to one aspect of the present invention, there is provided a reproducing apparatus provided with ID-data identifying means for reproducing, by a plurality of times, ID data recorded together with image data on a recording medium, and for determining that the ID data reproduced from a predetermined range on the recording medium is true ID data if such ID data coincide with each other during such a plurality of times of reproducing operations.

According to another aspect of the present invention, there is provided a reproducing apparatus provided with ID-data identifying means for repeatedly reproducing ID data recorded in different areas on a recording medium, and determining whether the ID data repeatedly reproduced from all areas coincide with each other. If such ID data do not coincide with each other by predetermined times, the ID-data identifying means determines whether the ID data repeatedly reproduced from a particular area on the recording medium coincide with each other by predetermined times.

With the aforesaid means, even if data reproduced from, e.g., a user area by a plurality of times do not coincide with each other due to noise but reproduced data obtained from a format area coincide with each other, it is possible to confirm the presence of ID information whereby reproduced ID data can be effectively utilized.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 3A is a view showing the recording format of an ID signal;

FIG. 3B is a timing chart of the circuit shown in FIG. 2;

FIG. 6 is a flowchart showing a modification of the embodiment shown in FIG. 5.

DETAILED DESCRIPTION OF THE PREFERRED EMBODIMENTS

Preferred embodiments of the present invention will be described below with reference to the accompanying drawings. Although the embodiments are explained with reference to reproduction of image information, the present invention is likewise applicable to reproduction of image information with sound information added or to reproduction of sound information alone.

Figure 1:
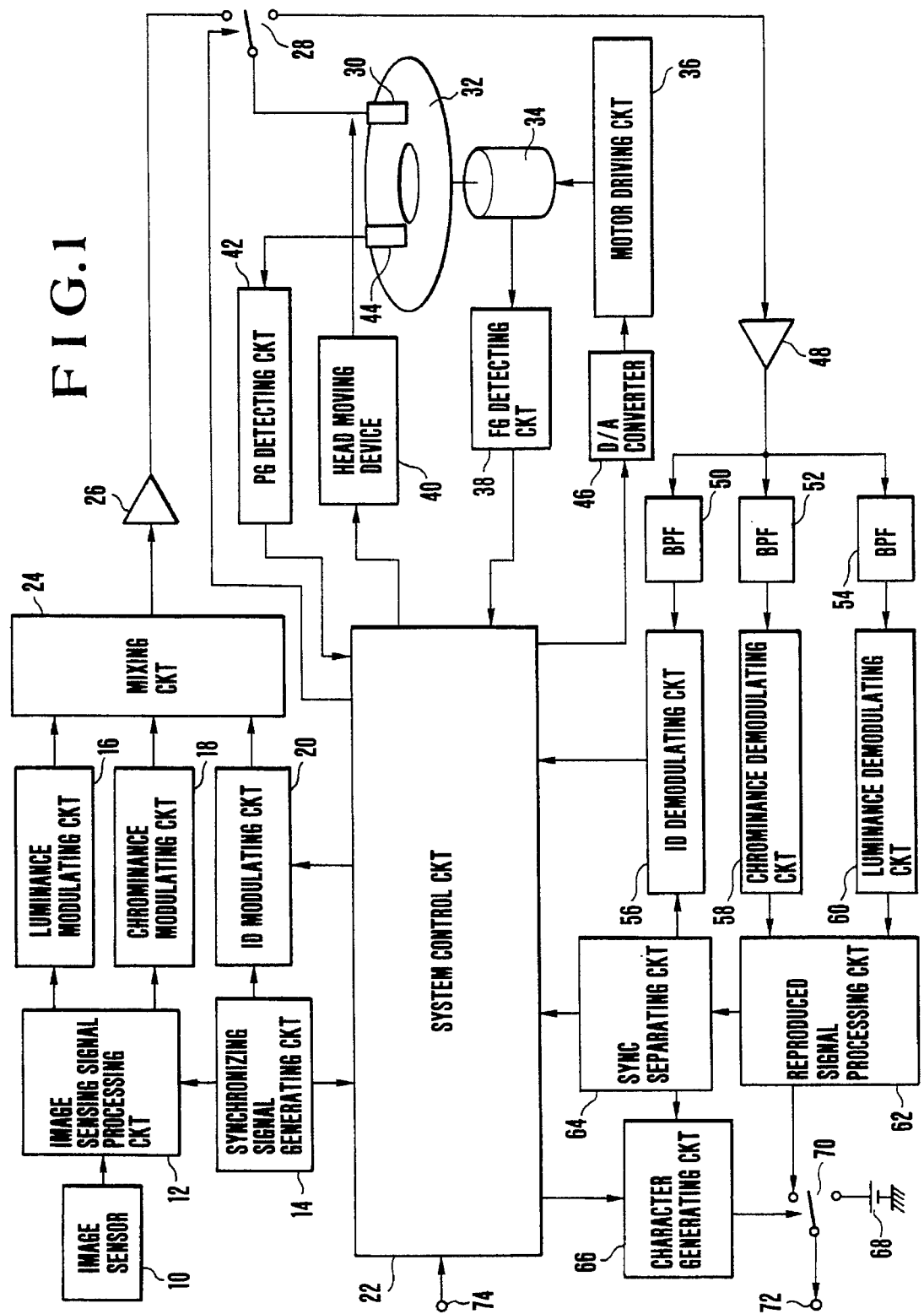
FIG. 1 is a block diagram showing the construction of one embodiment of the present invention.

FIG. 1 is a block diagram showing the construction of an electronic still camera provided with a reproduction function, which is one embodiment of the present invention. The shown electronic still camera includes an image sensor 10 for converting an optical image obtained by an optical system (not shown) into an electrical signal, an image sensing signal processing circuit 12 for converting an output signal of the image sensor 10 into a video signal, a synchronizing signal generating circuit 14 for generating a horizontal synchronizing signal and a vertical synchronizing signal, a luminance modulating circuit 16 for frequency-modulating a luminance signal outputted from the image sensing signal processing circuit 12, a chrominance modulating circuit 18 for frequency-modulating a chrominance signal outputted from the image sensing signal processing circuit 12, an ID modulating circuit 20 for modulating ID information to be recorded which is supplied from the system control circuit 22, a mixing circuit 24 for mixing the outputs of the modulating circuits. 16, 18 and 20, a recording amplifier 26, and a switch 28 which is switched between recording and reproduction.

The shown electronic still camera also includes a magnetic head 30 for recording and reproduction, a magnetic disc 32 serving as a recording medium, a motor 34 for causing the magnetic disc 32 to rotate, a motor driving circuit 36 for driving the motor 34, an FG detecting circuit 38 for detecting an FG signal indicative of the speed of rotation of the motor 34, a head moving device 40 for causing the magnetic head 30 to move radially on the magnetic disc 32, a PG detecting circuit 42 for detecting a PG pulse from the output of a PG coil 44, and a D/A converter 46 for converting into an analog signal a control signal supplied from the system control circuit 22 to the motor driving circuit 36.

The shown electronic still camera also includes a reproducing amplifier 48, a band-pass filter (BPF) 50 for extracting an ID signal component from the output of the reproducing amplifier 48, a BPF 52 for extracting a chrominance component from the same, a BPF 54 for extracting a luminance component from the same, an ID demodulating circuit 56 for demodulating the output of the BPF 50 and outputting the obtained ID information to the system control circuit 22, a chrominance demodulating circuit 58 for demodulating the output of the BPF 52 into a chrominance signal, a luminance demodulating circuit 60 for demodulating the output of the BPF 54 into a luminance signal, a reproduced signal processing circuit 62 for forming a video signal from the chrominance signal and the luminance signal reproduced by the respective demodulating circuits 58 and 60, a sync separating circuit 64 for separating a horizontal synchronizing signal and a vertical synchronizing signal from a signal outputted from the reproduced signal processing circuit 62, a character generating circuit 66 for generating a character pattern corresponding to a character code supplied from the system control circuit 22, a battery 68 for determining the luminance of a character generated by the character generating circuit 66, a switch 70 for superimposing a character on a reproduced video signal by switching between the battery 68 and the output of the reproduced signal processing circuit 62 in accordance with the output of the character generating circuit 66, an output terminal 72 for the reproduced video signal, and an input terminal 74 for receiving a control signal to externally give a command to the system control circuit 22.

Figure 2:
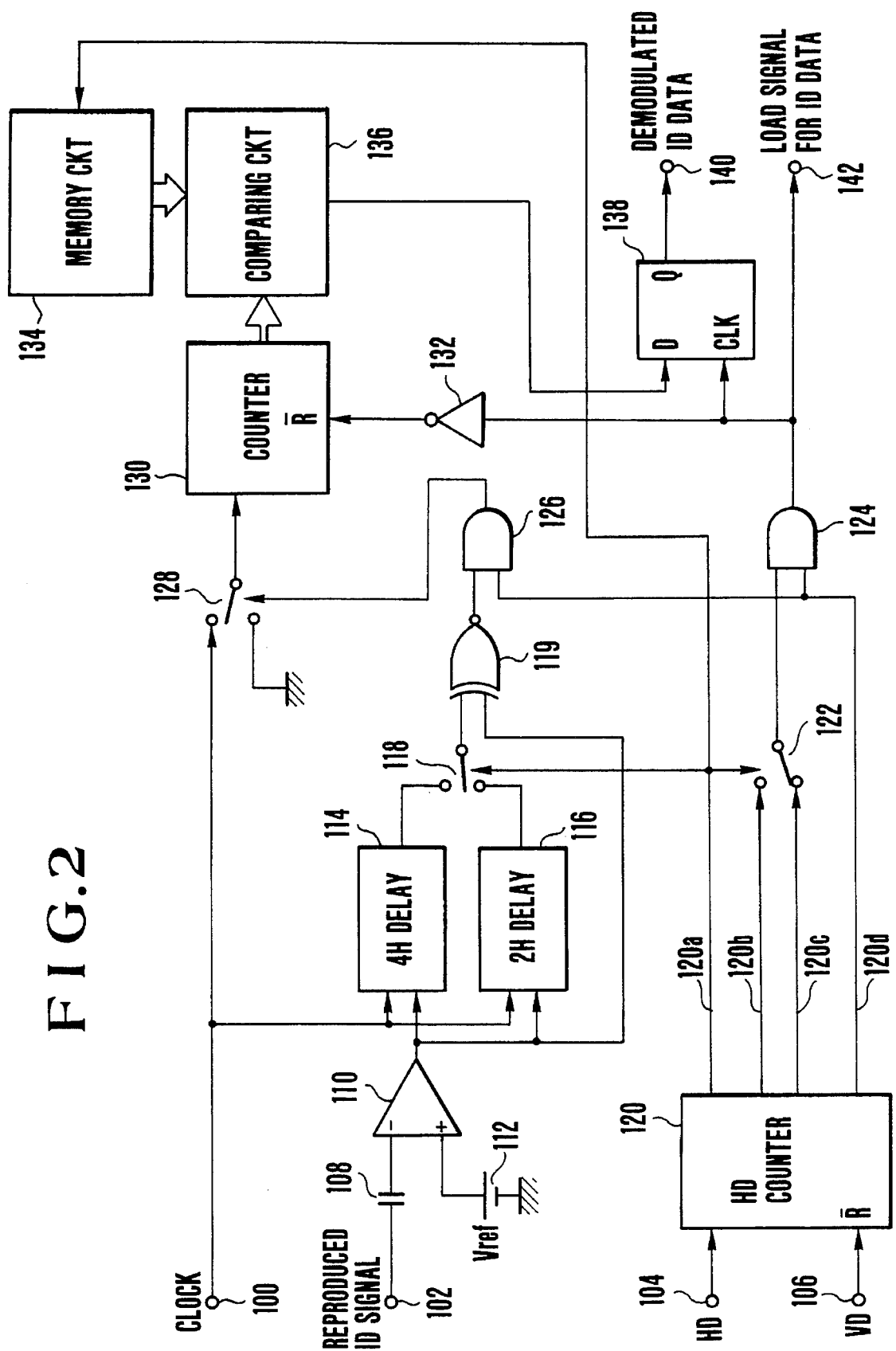
FIG. 2 is a circuit diagram showing an example of the circuit construction of an ID demodulating circuit 56 of FIG. 1.
Figure 4:
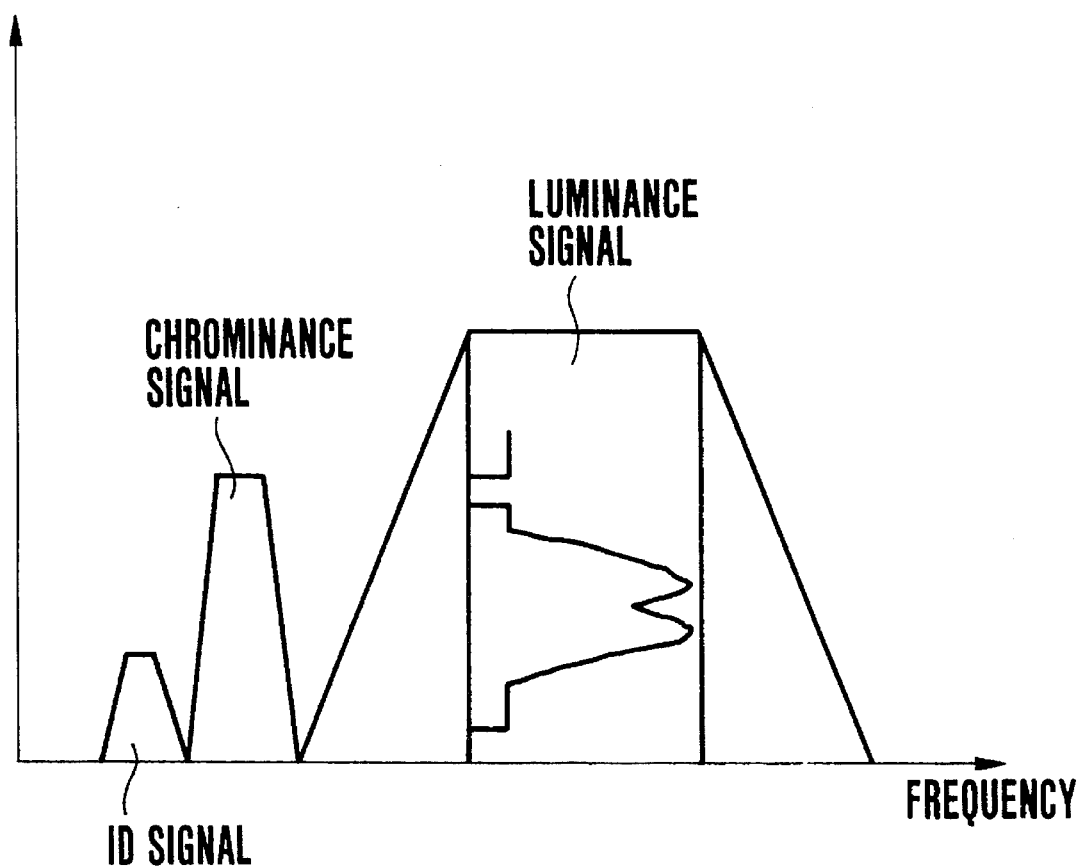
FIG. 4 shows a frequency allocation.

FIG. 2 is a block diagram showing the construction of one circuit example of the ID demodulating circuit 56. The shown circuit example includes an input terminal 100 for receiving a clock which is sufficiently higher in frequency than the horizontal synchronizing signal, an input terminal 102 for receiving the reproduced ID signal supplied from the BPF 50, an input terminal 104 for receiving a horizontal synchronizing signal HD from the sync separating circuit 64, an input terminal 106 for receiving a vertical synchronizing signal VD from the sync separating circuit 64, a capacitor 108 for cutting the DC component of the reproduced ID signal, a comparing circuit 110 for comparing the reproduced ID signal whose DC component has been cut with an output voltage Vref of the battery 112, a delay line 114 for delaying by 4 H the output of the comparing circuit 110 in accordance with the clock received at the input terminal 100, a delay line 116 for delaying by 2 H the output of the comparing circuit 110 in accordance with the clock received at the input terminal 100, a switch 118 for selecting one of the outputs of the delay lines 114 and 116, and an exclusive-OR circuit 119 for carrying out the exclusive-OR between the output of the switch 118 and the output of the comparing circuit 110.

The shown circuit example also includes an HD counter 120 which is reset by the vertical synchronizing signal received at the input terminal 106 and which counts horizontal synchronizing signals received at the input terminal 104 and outputs various timing signals. To cope with a difference of 0.5 H between each odd field and the associated even field, the HD counter 120 is arranged not to count the horizontal synchronizing signals for a ¾ H period after the vertical synchronizing signal. The HD counter 120 is in practice provided in the system control circuit 22. An output 120a of the HD counter 120 is a signal which is reset immediately before the vertical synchronizing signal and is set upon counting of the 144th H line after the vertical synchronizing signal. An output 120b is a signal which is obtained by dividing the frequency of the horizontal synchronizing signal by four. An output 120c is a signal which is obtained by dividing the frequency of the horizontal synchronizing signal by two. An output 120d is a signal which is reset immediately before the vertical synchronizing signal and is set upon counting of the 28th H line after the vertical synchronizing signal. The shown circuit example also includes a switch 122 for selecting one of the outputs 120b and 120c of the counter 120, and an AND circuit 124 for carrying out the AND between the output of the switch 122 and the output 120d of the counter 120. The output of the AND circuit 124 serves as a load signal for reproduced ID data.

The shown circuit example also includes an AND circuit 126 for carrying out the AND between the output of the exclusive-OR circuit 119 and the output 120d of the counter 120, a switch 128 for performing switching between the clock received at the input terminal 100 and a ground level in accordance with the output of the AND circuit 126, a counter 130 for counting clocks passed through the switch 128, the counter 130 being reset by the output of the AND circuit 124 inverted by an inverter 132, a memory circuit 134 for storing the number of clocks provided during a period equivalent to half of 2 H and the number of clocks provided during a period equivalent to half of 4 H, a comparing circuit 136 for comparing the number of clocks outputted from the memory circuit 134 with the count of the counter 130, a latch circuit 138 for latching a comparison output of the comparing circuit 136 in accordance with the output of the AND circuit 124, an output terminal 140 for demodulated ID data, and an output terminal 142 for a load signal for the demodulated ID data.

The output 120a of the HD counter 120 causes each of the switches 118 and 122 to perform a switching operation and controls data on the number of clocks to be outputted from the memory circuit 134.

Since the operation of the recording system of the aforesaid embodiment is similar to that of the conventional example, a description is omitted, and the following description chiefly refers to reproduction processing for an ID signal which constitutes a feature of the present invention.

Video information and associated ID information which are recorded on the magnetic disc 32 are electromagnetically converted by the magnetic head 30, then applied to each of the BPFs 50, 52 and 54 via the switch 28 and the reproducing amplifier 48, and then separated into an ID component, a chrominance component and a luminance component. The modulated chrominance signal and the modulated luminance signal are demodulated by the chrominance demodulating circuit 58 and the luminance demodulating circuit 60, respectively, and the demodulated outputs of both circuits 58 and 60 are combined into a video signal by the reproduced signal processing circuit 62. In the meantime, the character generating circuit 66 generates a character pattern under the control of the system control circuit 22, and the character pattern is superimposed on the video signal outputted from the reproduced signal processing circuit 62 and the result is applied to the output terminal 72.

In the ID demodulating circuit 56, the reproduced ID signal is demodulated in the following manner. FIG. 3A is a view showing the recording format of the ID signal, and FIG. 3B is a timing chart of the signal processing of the ID demodulating circuit 56. In the case of the above-described electronic still camera, the format of an ID signal recorded on one recording track on a magnetic disc together with a video signal is set as shown in FIG. 3A.

In general, it is specified that an ID signal is recorded in such a manner that one bit of information is represented with respect to either four horizontal synchronization periods (4 H (one horizontal synchronization period is hereinafter called "1 H")) or two horizontal synchronization periods (or 2 H) of the video signal. As shown in FIG. 3A, in the case of a format according to the NTSC television system, a blanking period of 28 H (28.5 H in a format according to the PAL/SECAM television system) is arranged immediately after the starting position of the vertical synchronizing signal of the video signal, and an initial bit of 1 bit in length is arranged with respect to the succeeding 4 H. Subsequently, field/frame identification data of 2 bits in length is arranged with respect to 8 H, track address data of 7 bits in length with respect to 28 H, 19-bit data indicative of year, month and day with respect to 76 H, and a user area of 54 bits in length with respect to 108 H (76 bits with respect to 152 H in a format according to the PAL/SECAM television system). Then, a switching point for a magnetic head in one recording track is arranged at a position spaced 3.5 H apart from the trailing end of the user area (3 H apart in a format according to the PAL/SECAM television system), and the starting position of the adjacent vertical synchronizing signal of the video signal is arranged at a position spaced 7 H apart from the switching point.

In addition, in the above-described recording format of the ID signal, the user area is constructed in such a manner that the first 6 bits constitute a mode setting area and the remaining area constitutes a data area. Data corresponding to a mode indicated by data recorded in the mode setting area is arranged in the data area.

Of the data recorded in the mode setting area, the first 2 bits can be used to set four kinds of modes such as those shown below:

Mode 0 (when the first 2 bits are "00") . . . Mode for writing "hour, minute and second", "shutter speed", "aperture value" and "numeral".

Mode 1 (when the first 2 bits are "01") . . . Mode for writing "alphabet".

Mode 2 (when the first 2 bits are "10") . . . Mode for writing "hour, minute and second" and "numeral".

Mode 3 (when the first 2 bits are "11") . . . Extension Mode.

If the mode 0, the mode 1 or the mode 2 is set by the first 2 bits in the mode setting area, a data area for setting data, such as "hour, minute and second", "shutter speed", "alphabet" and "numeral", starts with the third bit. If the mode 3 is set, sixteen new kinds of extension modes can be set by using the third bit to the sixth bit, a total of 4 bits.

In the present embodiment, in the user area of the ID signal, an extension mode is provided for setting the number of times of dubbing of a video signal and data associated with recording conditions indicative of whether a video signal to be subjected to dubbing is a video signal outputted from the image sensing part of the same electronic still camera or a video signal inputted from an external device via a decoding part which is not shown, and these data are recorded on a magnetic disc together with the video signal. Accordingly, by setting various parameters for reproduced-signal processing for dubbing in accordance with the data associated with the number of times of dubbing and the recording conditions, it is possible to suppress the deterioration of signals due to a dubbing operation, thereby achieving stable dubbing processing for the video signal.

For example, 6-bit data of "110010" may be set as the extension mode in the mode setting area of the ID signal, in which case if such data is set, data associated with "hour, minute and second", "number of times of dubbing", "recording condition" and "numeral" are written into the data area.

As described above, the format area of the ID signal starts at a position spaced 28 H apart from the starting position of the vertical synchronizing signal VD, and the user area starts at a position corresponding to the 145th H line. The start of the format area can be detected through the signal 120d, and the start of the user area can be detected through the signal 120a. By way of example, it is assumed here that the phase of the ID signal is represented by "a" and "b" (b=a+180°). If this is done, the output of the comparing circuit 110 shows a pattern of reversed phase as shown in Part (8) of FIG. 3B, and the outputs of the respective delay lines 114 and 116 show the patterns shown in Parts (9) and (10) of FIG. 3B.

The reproduced ID signal outputted from the BPF 50 (refer to FIG. 1) is inputted to the input terminal 102 shown in FIG. 2, and its DC component is cut by the capacitor 108 and the result is compared with the reference value Vref in the comparing circuit 110. Thus, the reproduced ID signal is waveform-shaped. The output of the comparing circuit 110 is applied to each of the 4 H delay line 114, the 2 H delay line 116 and the exclusive-OR circuit 119. The switch 118 selects the output of the 4 H delay line 114 in accordance with the signal 120a, so that the exclusive-OR circuit 119 carries out the exclusive-OR between the output of the 4 H delay line 114 and the output of the comparing circuit 110. If the output of the comparing circuit 110 is in phase with the output of the 4 H delay line 114, the output of the exclusive-OR circuit 119 is "0", while if they are in reverse phase with each other, the output is "1". The AND circuit 126 carries out the AND between the output of the exclusive-OR circuit 119 and the output 120d of the counter 120, and the switch 128 is controlled in accordance with the output of the AND circuit 126. If the output of the AND circuit 126 is "1", the switch 128 selects the clock supplied from the input terminal 100, while if it is "0", the switch 128 selects the ground side. In other words, only when the output of the AND circuit 126 is "1", is the clock is inputted to the counter 130.

In the meantime, the switch 122 selects the signal 120b obtained by dividing the frequency of the horizontal synchronizing signal by four or the signal 120c obtained by dividing the frequency of the horizontal synchronizing signal by two, in accordance with the output 120a of the counter 120. The AND circuit 124 carries out the AND between the selected signal and the output 120d of the counter 120. Thus, the AND circuit 124 outputs, as shown in Part (7) of FIG. 3B, no signal from the leading end of the vertical synchronization signal until the 28th H line, a signal obtained by dividing the frequency of the vertical synchronizing signal by four from the 28th H line until the 144th H line, and a signal obtained by dividing the frequency of the vertical synchronizing signal by two subsequently to the 144th H line. The output of the AND circuit 124 is outputted from the output terminal 142 as the load signal for the ID data, and is applied to the clock input of the latch circuit 138. Further, the output of the AND circuit 124 is inverted by the inverter 132, resetting the counter 130.

The memory circuit 134 outputs, according to the output 120a of the counter 120, the number of clocks for a period of half of 4 H in the case of the format area, and the number of clocks for a period of half of 2 H in the case of the user area. The comparing circuit 136 at all times compares the output of the memory circuit 134 with the count of the counter 130. If the count of the counter 130 is greater than the output of the memory circuit 134, the comparing circuit 136 outputs "1"; otherwise, it outputs "0". The latch circuit 138 latches the output of the comparing circuit 136 at the rise of the output of the AND circuit 124. Simultaneously, the counter 130 is reset.

In the above-described manner, the reproduced ID signal obtained by making a phase comparison every 4 H in the format area and every 2 H in the user area is obtained from the output of the latch circuit 138. The demodulated ID signal is outputted from the output terminal 140 to the system control circuit 22 and the load signal for the ID data, from the output terminal 142 to the system control circuit 22. The system control circuit 22 reads the demodulated ID signal in response to the rise of the load signal for the ID data.

A processing operation executed in the system control circuit 22 will be described below with reference to FIG. 5.

First of all, the range of ID data to be read is designated (Step S10) and, according to this designation, the HD counter 120 is set so that either the entire ID data or ID data in the format area is read (Steps S11 and S12). Of course, it is also possible to adopt an arrangement in which a different reading range can be designated.

Then, the vertical synchronizing signal VD is triggered (Step S13) and the count of a load signal for the ID data for confirmation of the reading range is reset to "0" (Step S14). The demodulated ID signal is read at the timing of the fall of the load signal for the ID data and stored in a memory (not shown) (Steps S15 and S16), and the count of the load signal for the ID data is incremented (Step S17).

Reading of the demodulated ID signal is performed (Steps S15, S16, S17) until the count of the load signal for the ID data reaches a value corresponding to the designated reading range (Step S18).

When the count of the load signal for the ID data reaches the value corresponding to the designated reading range (Step S18), it is determined whether the current reading operation is a first reading operation. In the case of the first reading operation, Step S13 and the following steps are repeated (Step S19). In the case of a second reading operation or later, the reproduced ID data which was read immediately before is compared with the reproduced ID data which has been presently read (Step S20). If they coincide successively three times in this comparison (Steps S20 and S21), the reproduced ID data is regarded as true data (Step S22), and the process is brought to an end. If the data do not coincide successively three times during seven times of reading operations (Step S23), it is determined that there is no ID data (Step S24), and the process is brought to an end.

Figure 5:
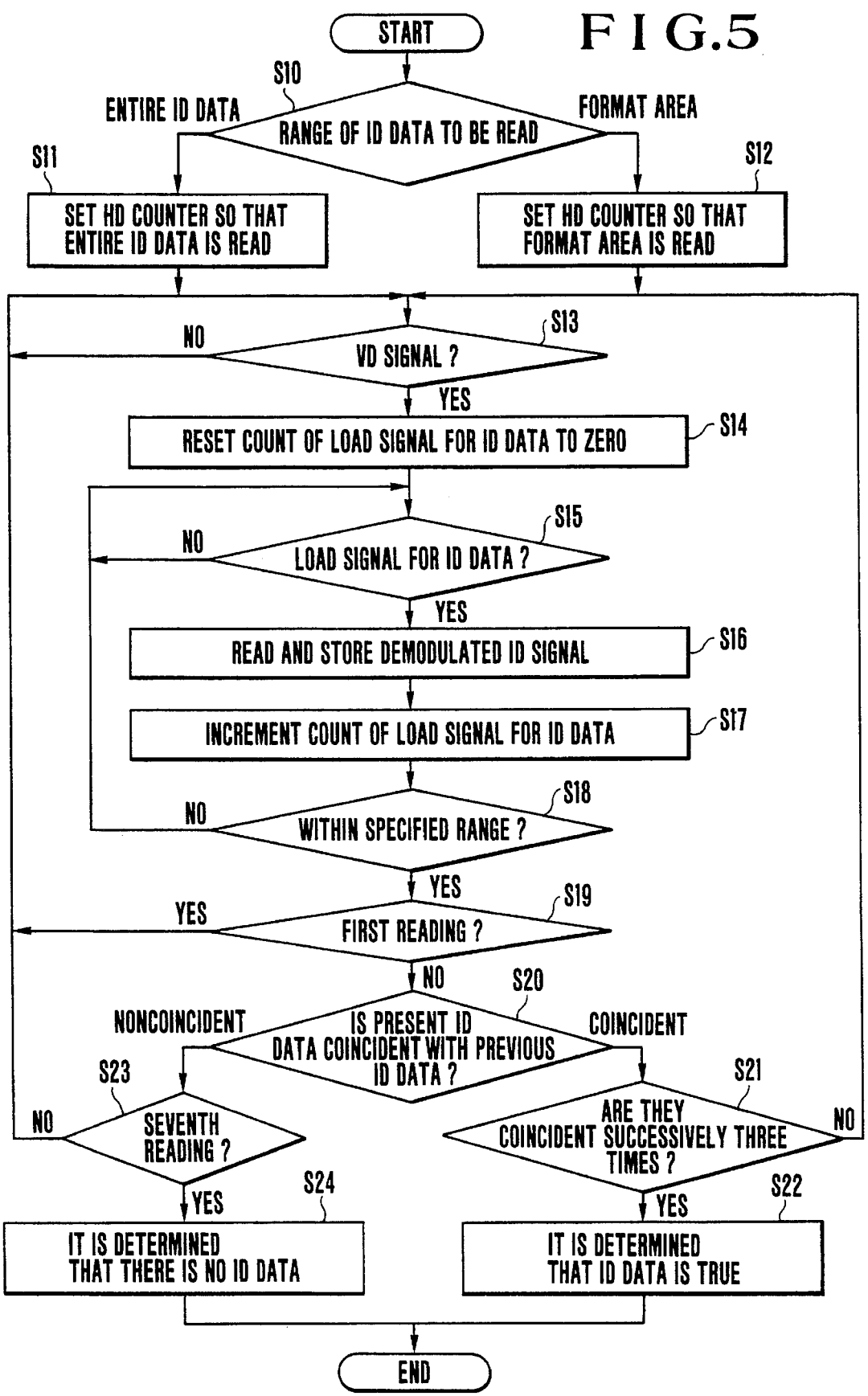
FIG. 5 is a flowchart showing the processing of a demodulated ID signal executed by a system control circuit 22 of FIG. 1.

FIG. 6 shows a flowchart in which the flowchart of FIG. 5 is modified. In this example, first of all, the HD counter 120 is set so that the entire ID data is read (Step S30), and subsequently the process proceeds in a manner similar to that explained in Steps S13 to S23 of FIG. 5. If the previous reproduced ID data coincides with the present reproduced ID data successively three times (Steps S38 and S39), the reproduced ID data is regarded as true data (Step S40), and the process is brought to an end. If the data do not coincide successively three times during seven times of reading operations (Step S41), then the HD counter 120 is set so that the format area alone is read (Steps S42 and S44), and reading of the format area is performed. In this case as well, if the previous reproduced ID data coincides with the present reproduced ID data successively three times (Steps S38 and S39), the reproduced ID data is regarded as true data (Step S40), and the process is brought to an end. If the data do not coincide successively three times during seven times of reading operations (Step S41), it is determined that there is no ID data (Steps S42 and S43), and the process is brought to an end.

As described previously, the user area is more susceptible to noise than the format area, so that the probability that erroneous reading occurs in the user area is higher than that in the format area. However, with the modification shown in FIG. 6, even if data is read in error in the user area, correct reading is carried out in the format area. Accordingly, it is possible to minimize loss of data.

As is readily understood from the foregoing description, in accordance with the present invention, since ID data is read from a designated range, it is possible to minimize loss of data. In addition, since no data is read from an unnecessary range, it is possible to lighten the burden imposed on data comparison processing.

What is claimed is:

1. A reproducing apparatus capable of reproducing image and/or sound data and identification data related to said image and/or sound data recorded on a recording medium, the identification data having a plurality of ranges, comprising:
   (a) reproducing means for reproducing the recorded image and/or sound data; and
   (b) identification data identifying means for designating a predetermined range of the identification data to be read from among the plurality of ranges, reading the identification data in the designated range a plurality of times, and determining that the identification data is true identification data if the identification data read the plurality of times coincide with each other a predetermined number of times within the plurality of times.

2. A reproducing apparatus according to claim 1, wherein on a subsequent reading of identification data, the read identification data is compared with previously read identification data.

3. A reproducing apparatus according to claim 1 or 2, wherein said identification data identifying means sets the range of the identification data to be read to an entire area in which the identification data is recorded, and sets a new range of the identification data to be read if the identification data read the plurality of times do not coincide with each other the predetermined number of times within the plurality of times.

4. A reproducing apparatus according to claim 3, wherein said identification data identifying means sets the new range of the identification data to be read to a format area.

5. A method of reproducing image and/or sound data and identification data related to said image and/or sound data recorded on a recording medium, the identification data having a plurality of ranges, comprising the steps of:

(a) setting a predetermined range of the identification data to be read from among the plurality of ranges;

(b) reading the identification data in the set range a plurality of times; and (c) determining that the identification data is true identification data if the identification data read the plurality of times coincide with each other for a predetermined number of times within the plurality of times.

6. A method according to claim 5, wherein on a subsequent reading of identification data, the read identification data is compared with previously read identification data.

7. A method according to claim 5, wherein the recording medium is selected to have a plurality of areas in which the identification data is read.

8. A method according to claim 7, wherein one of the plurality of areas is selected to be a format area.

9. A method according to claim 5 or 8, wherein the range of the identification data to be read is selected to be a format area.

10. A method according to claim 5, wherein the range of the identification data to be read is set to an entire area in which the identification data is recorded, and if the identification data read the plurality of times do not coincide with each other for the predetermined number of times, the range of the identification data to be read is set to a format area.

11. A reproducing apparatus capable of reproducing image and/or sound data and identification data related to said image and/or sound data recorded on a recording medium, the identification data having a plurality of ranges, comprising:

(a) reproducing means for reproducing recorded data from the recording medium;

(b) means for reading a predetermined range of the identification data from among the plurality of ranges of the identification data on the recording medium a plurality of times; and (c) identification data identifying means for determining that the read identification data is true identification data if the predetermined range of identification data coincides with each other a predetermined number of times.

12. A reproducing apparatus according to claim 11, wherein on a subsequent reading of identification data, the read identification data is compared with previously read identification data.

* * * * *

UNITED STATES PATENT AND TRADEMARK OFFICE
CERTIFICATE OF CORRECTION

PATENT NO. : 5,453,965
DATED : September 26, 1995
INVENTOR(S) : Hiroyoshi Misumi It is certified that error appears in the above-identified patent and that said Letters Patent is hereby corrected as shown below:

Cover Page, Item [54], line 2. Delete "REPRODUCING" and after "METHOD" insert -- FOR REPRODUCING IDENTIFICATION DATA RECORDED TOGETHER WITH OTHER DATA ON A RECORDING MEDIUM --.

Col. 1, line 2. Delete "REPRODUCING" and after "METHOD" insert -- FOR REPRODUCING IDENTIFICATION DATA RECORDED TOGETHER WITH OTHER DATA ON A RECORDING MEDIUM --.

Signed and Sealed this

Ninth Day of January, 1996

Attest:

*Attesting Officer*

BRUCE LEHMAN
*Commissioner of Patents and Trademarks*